United States Patent [19]

Bussard

[11] Patent Number: 5,455,129
[45] Date of Patent: * Oct. 3, 1995

[54] HOLOGRAPHIC PRODUCTS WITH SEALED EDGES

[76] Inventor: Janice W. Bussard, 201 N. Fruitport Rd., Spring Lake, Mich. 49456

[*] Notice: The portion of the term of this patent subsequent to Jun. 13, 2006 has been disclaimed.

[21] Appl. No.: 174,195

[22] Filed: Dec. 27, 1993

Related U.S. Application Data

[63] Continuation-in-part of PCT/US93/04478, May 4, 1993, which is a continuation-in-part of Ser. No. 883,285, May 14, 1992, Pat. No. 5,281,499, and a continuation-in-part of Ser. No. 14,370, Feb. 5, 1993, Pat. No. 5,314,767, each said application Ser. No. 883,285, and Ser. No. 14,370, is a continuation-in-part of Ser. No. 647,512, Jan. 28, 1991, abandoned, which is a continuation of Ser. No. 292,826, Jan. 3, 1989, abandoned, which is a continuation-in-part of Ser. No. 147,492, Jan. 25, 1988, Pat. No. 4,838,965.

[51] Int. Cl.⁶ ................................................. B32B 31/02
[52] U.S. Cl. ...................... 430/1; 430/2; 359/2; 359/1; 283/86; 283/901
[58] Field of Search .................... 156/510, 515, 156/251, 267; 430/1, 2; 359/1, 2; 283/86, 901

[56] References Cited

U.S. PATENT DOCUMENTS

| | | | |
|---|---|---|---|
| 3,695,806 | 10/1972 | Arfert | 425/398 |
| 4,547,006 | 10/1985 | Colgate, Jr. | 283/86 |
| 4,838,965 | 6/1989 | Bussard | 430/1 |
| 4,856,857 | 8/1989 | Takeuchi et al. | 283/904 |
| 4,956,040 | 9/1990 | Fry | 156/267 |
| 5,044,707 | 9/1991 | Mallik | 283/86 |
| 5,085,514 | 2/1992 | Mallik et al. | 283/86 |
| 5,145,212 | 9/1992 | Mallik | 283/86 |
| 5,281,499 | 1/1994 | Bussard | 430/1 |
| 5,314,767 | 5/1994 | Bussard | 430/1 |

FOREIGN PATENT DOCUMENTS

| | | | |
|---|---|---|---|
| 62-17783 | 1/1987 | Japan | 430/2 |
| 63-143580 | 6/1988 | Japan | 430/2 |

OTHER PUBLICATIONS

"Principles of High–Polymer Theory and Practice" Schmidt et al. ©1948 pp. 696–699.
Skiest "Handbook of Adhesives" (1962) pp. 557–560.

Primary Examiner—Charles L. Bowers, Jr.
Assistant Examiner—Martin Angebrannndt
Attorney, Agent, or Firm—Joseph K. Andonian

[57] ABSTRACT

A holographic product with sealed edges which will resist delamination before and after attachment to a substrate when exposed to moisture or abrasion resulting from ordinary usage. The holographic product comprises a transparent abrasion resistant moisture impervious plastic top layer, an adhesive bottom layer, an intermediate reflective surface or layer and a seal along the entire perimeter. The seal is preferably produced by a hot cutting tool.

11 Claims, 2 Drawing Sheets

HOLOGRAPHIC PRODUCTS WITH SEALED EDGES

CROSS-REFERENCE TO PREVIOUS APPLICATIONS

This application is a continuation-in-part of my copending International application Ser. No. PCT/US93/04478 filed May 4, 1993, which is a continuation in part of U.S. Ser. No. 07/883,285 filed May 14, 1992, now U.S. Pat. No. 5,281, 499, and U.S. Ser. No. 08/014,370 filed Feb. 5, 1993, now U.S. Pat. No. 5,314,767, which are continuations-in-part of Ser. No. 07/647,512 filed Jan. 28, 1991, now abandoned, which was a continuation of Ser. No. 07/292,826 filed Jan. 3, 1989, now abandoned, which was a continuation-in-part of Ser. No. 07/147,492 filed Jan. 25, 1988, now U.S. Pat. No. 4,838,965 issued Jun. 13, 1989, entitled "HOLOGRAPHIC ART APPLIED TO T-SHIRTS OR OTHER TEXTILE PRODUCTS".

TECHNICAL FIELD

This invention relates to holographic materials (such as holograms or diffraction gratings) with sealed edges. The products of the invention are particularly suitable for affixing to substrates that will be exposed to almost any degree of wear and tear during use or any amount of exposure to moisture over the useful life of the products before and after attachment to substrates.

BACKGROUND PRIOR ART

Holography has been used widely in a variety of applications to reproduce three-dimensional images. U.S. Pat. No. 4,589,686 describes usage for anti-counterfeiting purposes such as on credit cards, probably the most widely recognized use at the present time. The same patent also discloses many other patents relating to diffraction grating patterns and three-dimensional images of objects and scenes. The cover of the *National Geographic* issue of March, 1984, is another example of use to increase the attractiveness of the magazine to the observer. The same issue of the *National Geographic* contains a good description of holography.

The first successful use of holographic materials on fabrics was originally disclosed in my U.S. Patent No. 4,838,965. Since that time two other U.S. Pat. Nos. 4,956, 040 and 5,073,222 have issued to another inventor. The methods of these two more recent patents achieve resistance to repeated washing by enveloping a precut hologram between a clear polyester coating and an adhesive scrim backing and then adhering the resulting laminate to wearing apparel with the adhesive in the scrim. The addition of a separate polyester layer on top of the hologram and scrim underneath adds two layers which reduce flexibility and increase stiffness in a product where a "soft hand" is highly preferable. In addition the separate polyester layer of this pouch or envelope that is not embossed interferes with the clarity of the holographic image.

Still another example of the use of sealing holographic products at the perimeter to prevent the hologram from being attacked by water can be found in U.S. Pat. No. 5,095,375. This patent utilizes a polymer or metal film bound by an adhesive to the perimeter of two substrates (for example, glass substrates) that thereby fully enclose or encapsulate a water sensitive hologram. The product of the present invention can be affixed to a single glass substrate and accomplish substantially the same result.

The holograms and diffraction gratings disclosed in my U.S. Pat. No. 4,838,965 as well as many of those manufactured and sold today for application to various substrates are multi-layered products. Although other layers may be present depending on the manufacturer, most of these products contain a plastic carrier, a reflective intermediate surface or layer, and an adhesive backing. The adhesive material is often activated by heat and pressure to attach the holographic materials to appropriate substrates and is generally referred to as an iron-on adhesive. Pressure sensitive and contact adhesives are also used especially where the holographic materials are intended for attachment to paper substrates for labeling or advertising purposes. The embossed surface of the metallized plastic carrier disclosed in U.S. Pat. No. 4,838,965 actually reproduces the three-dimensional image or pattern when light is reflected through the transparent plastic by the metallic layer. This means of reproduction is most commonly referred to as embossed holography. A more complete description can be found in Chapter 9 of *Holography Marketplace,* Ross Books, March, 1991. These holograms and diffraction gratings are generally available in sheets of film or foil bearing images or patterns on a repetitive or continuous basis throughout their length and breadth. The sheets are at least six inches wide and are usually sold in rolls up to two hundred feet long. The purchaser can cut the images or patterns out of the sheets to suit his needs. For example, the hologram of the Golden Gate bridge depicted in my U.S. Pat. No. 4,838,965 would be repeated throughout a commercially available sheet bearing many reproductions of that holographic image. The purchaser can cut each image of the bridge out of the sheet and attach it to whatever substrate he deems appropriate for his purposes. For example, such holograms can be affixed by the mechanized hot stamping process to the paper cover of a magazine such as the above *National Geographic* issue while the manual pressure sensitive process would be suitable for small quantities.

Strictly speaking, a diffraction grating or the related micro-etching or color explosion are not holograms but the commercially available versions employ the same multi-layered structure as an embossed hologram. The purpose of such products is to create the illusion of depth and motion as light is diffracted from the surface of the material without the prohibitive expense of originating holographic master plates. Diffraction grating requires a master grating to make a die which produces a replica of the grating in the metallized film. Micro-etching transfers line art or a continuous tone photograph to a master die for creating an image by using graphic screens. The color explosion employs what is known in the graphic arts industry as stepping to include drop down, side step, dimensional side step, rotation in varying degrees and back up. These techniques enable the customer to choose from a wide variety of options to achieve different visual effects. The multi-layered structure in all products requires a layer of adhesive on the back for protecting the reflective layer as well as the adhesion characteristic necessary for bonding to various substrates with heat and pressure. Since the problems associated with the structure of all these holographic materials are essentially the same with or without attachment to a substrate, they are considered to be equivalents of the hologram for purposes of the present invention. The word "holographic" when used in this specification in combination with words such as "products", "materials" or "films" can be taken to include holograms, diffraction gratings, micro-etchings, color explosions or any other light reflecting product having the same multi-layered structure.

Another more recent development in the holography industry involves a demetallized holographic foil suitable for application to various substrates requiring limited laundry or dry cleaning. This structure eliminates approximately 78 to 80% of the reflective metal layer. The resulting product reflects subtle pastels creating a fashionable yet less metallic look with a glamorous appearance. When paired with a appropriate double-sided adhesive coated heat sealable film, it becomes a heat transfer foil. Presently Sealtran Corporation, Chicago, Ill., 60614 manufactures this double-sided adhesive coated film known as AD as an attractive laminated pouch for drivers licenses, bus passes and other letter size envelopes or pouches. For the purpose of this invention this same material can add a decorative accent to textiles and other substrates by using it as a cold peel heat transfer foil or integrating it into a heat transfer design. The concept of transfers is not new but using demetallized or other holographic materials with sealed edges alone or as a component of a larger design is new. This material can be used as the sole decoration on fabric by placing the desired shape of the demetalized holographic material in registration with the same shape of the double-sided adhesive coated film on the fabric with the textile adhesive side in contact with the fabric and the AD adhesive side in contact with the holographic material. This completed assembly is covered with silicone paper and sealed in place by a heat press with medium pressure and a temperature of about 300 degrees Fahrenheit for about 8 seconds. After cooling the paper is peeled away exposing the metallized holographic imagery. Although fragile to various environmental conditions, it can withstand limited washing if hung to air dry. The finished product offers the customer an enhanced focal point with drawing power.

Security devices such as the Visa and Mastercard credit cards displaying reflective holograms have been used for approximately nine years and although they still have security value provided by the integrated hologram, the current trend is toward the use of clear holography on credit cards offering transparency with greater reflectivity. These holograms are comprised of a multi-layered material to include a synthetic carrier, a sandwiched reflective layer and an adhesive back. However the interposed reflective material is not metallized but a complex, silicone-based chemical compound which provides an optical coating. Although presently expensive as a security measure, a clear hologram permits the viewer to see imagery, numbers, letters or symbols on the substrate to which it is attached thereby providing another security capability for the security industry. The reflective sandwiched layer, regardless of its composition, requires protection from damaging environmental forces. This can be accomplished by sealing the edges. The equipment making clear holography possible is manufactured by Datacard in Havant, UK and Holland and marketed as recently as October, 1992.

While the prior art provides holographic materials for attachment to substrates, it does not provide such materials that can be readily and inexpensively attached to substrates that will be exposed to the strenuous conditions of ordinary use. Even ordinary environmental insults such as rain, humidity, heat, cold, and wind will affect the quality of the embossed surface after a period of time if not protected by sealing the edges. Holographic products are especially unsatisfactory for attachment to clothing which will be repeatedly subjected to washing, drying and even dry cleaning. Even my earliest processes for dealing with this problem, although advancements over the prior art of their day, were more cumbersome and expensive and the edges of the resulting products were not sealed as consistently as would be desirable.

The present invention differs from my previous inventions in the use of a broader class of adhesives including contact and pressure sensitive adhesives and even adhesives that are not completely impervious to moisture. I have discovered that sealing the edge of holographic materials that will eventually be attached to either moisture permeable or moisture impermeable substrates still results in a product that withstands abrasion better and resists deterioration from exposure to moisture better than the same holographic materials without a sealed edge.

OBJECTS OF THE INVENTION

A principal object of the present invention is to provide improved holographic materials which can be easily affixed to water permeable or impermeable substrates utilizing a broad class of adhesives including water permeable adhesives.

Another object of the present invention is to provide an improved interfaced assembly comprising an embossed transparent plastic carrier top layer, a reflective intermediate layer or surface, an adhesive bottom layer, and an impermeable seal at the perimeter which resists separation of the assembly before and after attachment to water permeable or impermeable substrates and exposure to abrasion and moisture more effectively than previously available products.

Still other objects will become apparent to those skilled in the art by the disclosure that follows.

DISCLOSURE OF THE INVENTION

The present invention addresses the need for expanding the use of holographic products for attachment to substrates that will be subjected to the wear and tear of ordinary usage and especially exposure to moisture commonly found in the environment of ordinary usage. The invention reduces the potential for damage to such products through ordinary wear and tear by effectively and economically sealing the edges during the normally required cutting portion of the process of producing such products in anticipation of their attachment to water permeable or impermeable substrates. It was previously thought that edge sealing was desirable only for attachment to substrates such as textiles with would be expected to be subjected to the strenuous conditions encountered by washing and drying where a water impermeable adhesive was also necessary. It was also thought that heat activated adhesives were necessary since liquified adhesives would bind the uneven surfaces of fabrics better. It has now been discovered that edge sealing is also beneficial for substrates that will not be subjected to washing and drying but will nonetheless be exposed to abrasion and moisture from humid air or rainfall. Thus holograms on magazine covers that sometimes get wet, are stored in humid conditions or are subjected to abrasion will last longer if the edges of the holograms are sealed. Likewise holographic materials used on outdoor signs which are exposed to considerable rain and snow will last longer if the edges of the holograms are sealed. It has also been discovered that such benefits will also flow from use of contact or pressure sensitive or even water permeable adhesives, especially where pressure sensitive and contact adhesives are preferred because of the ease with which they will attach to substrates. The holographic materials with sealed edges and water permeable adhesives can be used most advantageously on water impermeable substrates such as license plates or porcelain cups.

Where the dominant objective is provide protection for the holographic materials, water impermeable adhesives are preferred.

The present invention provides improved holographic products suitable for application to many different substrates that are subjected to considerable wear and tear in ordinary use or are exposed to moisture and methods for producing such products. Especially because these improved holographic materials are suitable for use under adverse conditions, the present invention also makes it practical to combine holographic art in various forms with printed graphics and other color and design enhancements on a variety of substrates. Without appropriate modification these commercially available, multi-layered materials will delaminate and deteriorate rapidly enough to limit the use of such visual enhancements. Most often the top layer of the holographic material will separate by abrasion and/or by penetration with water between the layers and the multi-dimensional or iridescent effect will deteriorate significantly or be lost completely. Likewise without a suitable adhesive the holographic material will separate wholly or partly from the substrate. The adhesive should not only protect the embossed surface of the holographic material but also firmly attach the holographic material to the substrate over the expected life of the resulting assembly. Since the substrate is not always completely smooth, as is the case with porous woven fabrics, it is also important that the adhesive provides a suitable surface for engagement with the holographic materials. Otherwise the reflected holographic image or pattern will be distorted by the irregularities in the substrate. The present specification describes further improvements at the edges or perimeter of holographic materials to make them much more impervious to delamination than was previously possible. The present specification also provides further enhancements in the associated graphics to create an even more dramatic visual effect than that emanating from the holographic materials per se.

The plastic layer of these commercially available holographic and diffraction grating films is most commonly a thermoplastic polyvinylchloride (PVC) but polyester is also used. It should be thin enough to be completely transparent and substantially pliable and yet tough and moisture impervious enough to protect the holographic materials from deterioration by exposure to moisture and abrasion. Polyethylene, vinyl and polypropylene are also acceptable and may be superior in some respects. This plastic layer usually varies in thickness from 0.075 to 0.20 mm. Other films with varying properties that can be used are described in Kirk-Othmer's *Encyclopedia of Chemical Technology*, Third Edition, John Wiley & Sons, 1978, beginning on P. 227 of Volume 10. Of particular importance for present purposes are the following characteristics: transparency, water or moisture impermeability, thermal properties capable of withstanding the conditions of manufacture and use, memory (i.e., the ability to retain an embossed surface) and resistance to abrasion.

One suitable adhesive backing, especially but not exclusively for fabric substrates, is a moisture impermeable thermoplastic which is usually characterized commercially as an "iron-on" adhesive. These adhesives are predominantly polyester or polyacrylic in character and require heat and pressure to activate. Adhesives that are chemically cross-linked and bond readily to fabrics when activated are also useful for the present invention. SAF-90 is the trademark for such a product sold by Stahl's of St. Clair, Mich., and is an example of such an adhesive. Adhesives that are used to bond layers of fabrics together are also generally satisfactory to bond holographic materials to fabrics. U.S. Pat. No. 5,009,943 discloses several such adhesives.

Many other adhesives can also be used for purposes of the present invention the particular choice being dependent on the character of the two surfaces to be bound to each other, the circumstances under which the bonding is to be accomplished and the intended use of the resulting products. A thorough discussion of adhesives can be found in *Ullmann's Encyclopedia of Industrial Chemistry*, VCH Verlagsgesellschaft mbH, Germany, 1985, Vol. A1, at pages 221–267 and *Encyclopedia of Chemical Technology*, Fourth Ed., John Wiley & Sons, NYC, 1991, Vol. 1, at pages 445–466. For most present purposes heat and pressure activated adhesives are preferred. However, contact, pressure sensitive, rubber based, emulsion, hotmelt, natural product, polyurethane, acrylic, epoxy, phenolic and polyimide all have their particular preferred applications.

The hologram image and the diffraction grating or micro-etching pattern in many of these products is stamped with a master die or shim into a thin mirror-like metallic foil vacuumized to one side of a plastic carrier material. When light passes through the plastic carrier, it is reflected back through the plastic by the metal foil in a diffused pattern to display the three-dimensional holographic image or embossed diffraction grating or other related light reflecting products that can be produced from the plastic-metal sandwich. The metal foil generally consists of aluminum which is never altered in color. Holographic foil can be colored by (1) adding a tint or dye lacquer coat over the top of the polyester carrier, (2) using a tint or dye to color the polyester during its manufacture, (the only practical option presently known for bonding to fabrics) or (3) adding a lacquer tint or dye as a separate layer between the polyester carrier and the metal foil. Additional layers of various materials are also commonly found in these holographic products. However, the only critical materials for present purposes are the transparent carrier top layer, the reflective intermediate surface or layer and the adhesive bottom layer which in combination reflect a three-dimensional image or iridescent pattern in the presence of light and permit appropriate attachment to substrates. Desirable enhancements of the reflected design or pattern can be achieved by various known techniques such as color explosion alone or combined in various ways with micro-etching. Other decorative techniques include over-printing, sublimation, flexography and thermal transfer printing.

Instead of embossing the holographic image or diffraction grating into a metal-backed plastic carrier, the plastic carrier itself can be embossed and the metal coating can be deposited on the embossed surface afterwards. Further information on processes for making embossed holograms can be found in U.S. Pat. No. 4,913,504.

Although in the most preferred embodiment of the product of the present invention an intermediate metallic or nonmetallic reflective layer is desirable, it is not absolutely necessary. Instead the underside of the plastic top layer can be embossed in the desired pattern and the adhesive layer added. It is still necessary to seal the cut edges of this two-layered product to resist delamination of the assembly and deterioration of the embossed surface.

Thus the bare bones product embodiment of the present, invention consists essentially of a plastic top layer, an adhesive bottom layer and an intermediate reflective surface or layer on the underside of the top layer with sealed edges, especially where sealing is accomplished with a hot cutting tool means. The preferred process for producing the product of the present invention consists essentially of cutting and simultaneously sealing the cut edges of such products in their desired outlines, especially with hot cutting tool means. It is not clearly understood why or how the a hot cutting tool forms such a complete seal between the dissimilar layers that make up the holographic assembly. Visual examination of the cut edge of the product with an electron or laser microscope seems to indicate that the melted plastic top layer is largely responsible for the seal. In any case the process simply and surprisingly works.

Holopak Technologies, Inc. of East Brunswick, N.J., Dazzle Enterprises, Inc. of Richmond, Va., Diffraction Company of Riderwood, Md., and Sealtran of Chicago, Ill. are examples of companies from which iron-on holograms and/or diffraction gratings can be obtained for use in the process and product of this invention. FLEXcon Company, Inc. of Spencer, Mass. and Coburn Corporation of Lakewood, N.J. are examples of companies from which holographic materials can be obtained for such use with a variety of adhesive backings including but not limited to thermoplastic and pressure sensitive adhesives.

The present specification discloses three cutting and sealing processes to provide further improvements in holographic products, especially in the seal at the perimeter of the product, and processes for producing the products.

The processes employ cutting with a hot tip, a heated die and a laser beam. All of these processes employ heat to perfect the seal during the cutting process. They do so more economically and at a much faster rate than earlier processes. Both the hot tip and the laser can employ computer controls to cut complex shapes and patterns. Die cutting, especially heated steel rule die cutting, is better suited for cutting simpler patterns preferably having curvilinear outlines—such as circles, ovals or rectangles with curved corners—especially when large volume production of a particular shape is desired. In addition to economical production of complex outlines in large numbers, laser cutting also produces the best seal and the smoothest edge with a minimum of waste and clean up effort. A smooth edge that lacks burrs is not insignificant for uses that will necessarily and frequently come in contact with human skin, such as on clothing.

My original invention consisted of attaching commercially available holograms to fabrics (especially T-shirts), integrated into screen printing inks, by heat and pressure to seal the edges of the hologram with adhesives and provide a water impermeable interface between the hologram and the fabric. My present application differs in sealing the edges of a hologram or diffraction grating without using adhesives for that specific purpose. It also differs in permitting the use of a larger variety of adhesives such as contact, pressure sensitive and even water permeable adhesives. One example of an appropriate sealing process involves the use of hot cutting equipment with interchangeable templates positioned to cut holographic material and sealing the edges in one operation. Another example involves the use of a mechanical flatbed computerized machine to cut and seal the edges of holographic materials with a heated iron tip. The machine is marketed by Stahl's, 20602 Stephens Drive, St. Clair Shores, Mich. 48080, under the trademark TEXICUT. This discovery was the first known use of heat to help seal the edges of holographic materials. Holographic materials cut with this machine proved to be more resistant to separation and deterioration after repeated washing and drying cycles than holographic materials whose edges were sealed with adhesives. The use of the TEXICUT machine also made it possible for precut and sealed holographic materials per se to be marketed directly to the consumer market and small screen printers and retail establishments for bonding to various substrates with simple heat transfer machines and even household irons.

The use of the hot tipped cutter also made it possible to mechanize completely the process of producing holographic materials interfaced to various substrates by visually scanning art work electronically, transferring the imagery into a CPU which is exported to a disk to a numerical file (called digitizing). The disk is now ready for use in the TEXICUT. The addition of processes utilizing a heated die and a laser beam, disclosed for the first time in the present application, provided even greater flexibility in processing holographic materials to the greatest advantage.

In the process of the present invention, the edges at the perimeter of holographic products produced are sealed before attachment to substrates. By separating the sealing operation from the process of attaching the holographic materials to a substrate, the process of attachment is greatly simplified. An ordinary heat transfer or heat sealing machine, such as any retail T-shirt store would possess, or even a household iron can be used to attach the holographic materials to a substrate.

BRIEF DESCRIPTION OF THE DRAWINGS

FIGS. 1 and 2 are not drawn to scale and are merely pictorial representations of the essential features of the product of the present invention.

MORE DETAILED DESCRIPTION OF THE PREFERRED EMBODIMENTS

Figure 1:
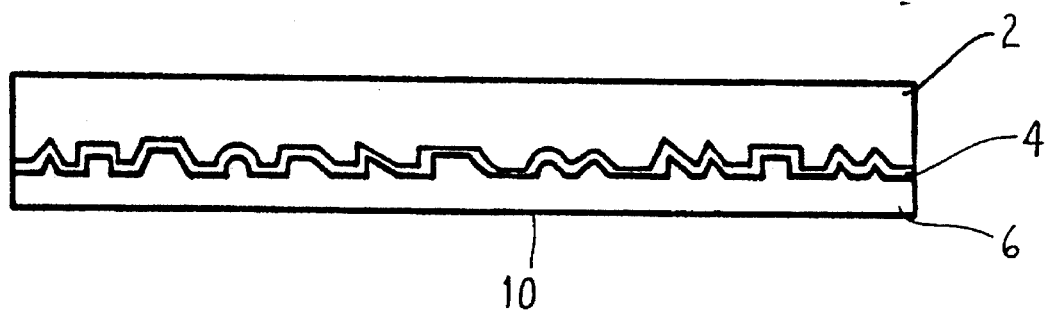
FIG. 1 is a greatly enlarged cross-sectional view of embossed holographic material if no attempt had been made to seal the edges along the perimeter of the hologram.
Figure 2:
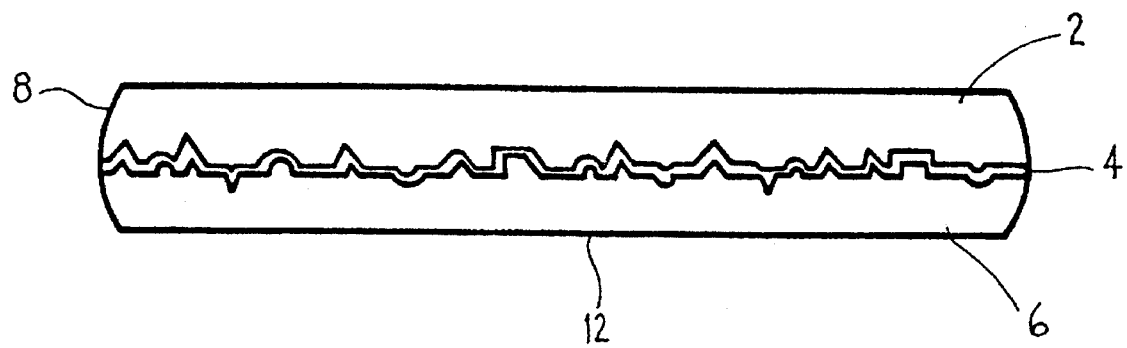
FIG. 2 is a cross-sectional view of a hologram whose edges have been sealed by cutting at an elevated temperature and thereby fusing the edges together in a very narrow band.

The preferred product of the present invention is illustrated in FIG. 2 of the drawings. The hologram 12 depicted there comprises an embossed plastic carrier 2, a mirror-like metallic backing 4, an adhesive layer 6 and a sealed edge 8 which is moisture impervious. Any other product utilizing an embossed surface or other related light reflecting process to display an iridescent pattern instead of a hologram through the plastic top layer and intended for attachment to a substrate would have the same essential structure and is included within the scope of this invention. When this embodiment is attached to a substrate, less time, effort and equipment is required to achieve the desired degree of resistance to moisture and abrasion. FIG. 1 differs only in the absence of a sealed edge. When exposed to water this product will delaminate especially when attached to clothing which is subjected to repeated washing and drying. The top layer 2 will soon separate from the other two layers 4 and 6 exposing the embossed surface to abrasion and thereby distorting the embossed surface and spoiling the reflected image or pattern.

Figure 3:
FIGS. 3, 4 and 5 are frontal views of holographic materials with complex shapes which are best cut and sealed with lasers or hot tipped cutters.
Figure 4:
Figure 5:
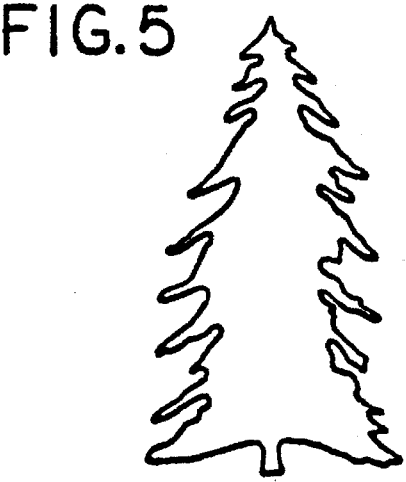

The previously described TEXICUT machine can be used to cut and seal the edges of the holographic materials simultaneously. The machine can be programmed to cut holographic materials in complex shapes and sizes such as shown in FIGS. 3, 4 and 5 by first scanning the art work with a computer and a scanning program such as Photo Finish. The image is then traced automatically using Adobe Streamline followed by digitization of the image with a Conversion program and copying onto a disk. The disk is inserted into the TEXICUT machine, the basic commands are keyed into its control panel to indicate the desired size, quantity and choice of one or two colors. Finally the holographic material is tacked down on the flatbed and the iron tip of the machine slowly outlines, cuts and seals the edges of the holographic material in sizes ranging from ½ to 12 inches in height simultaneously. After picking the cut and sealed holographic material off the flatbed and weeding (i.e., removing the waste material), the products are ready for attachment to substrates such as T-shirts with a heat transfer machine such as found in most retail T-shirt shops or even more simply by do-it-yourselfers with a household iron. Heat of approximately 330 degrees Fahrenheit for about 8 seconds is sufficient for such attachment.

Cutting, and simultaneously sealing the edges of, multi-layered embossed holographic materials to form simple shapes and sizes, such circles and rectangles (preferably with rounded corners), in large quantities can be accomplished economically by utilizing a heated steel rule die. Steel rule die cutting is an old industrial art described on pages 6–25 to 6–28 of the *Tool and Manufacturing Handbook*, Fourth Edition. Volume II. Forming, Society of Manufacturing Engineers, 1954. These dies are sometimes referred to as cookie cutter or low cost dies. The dies are constructed of low-cost materials and take little time to make. For purposes of the present invention, single-element dies (i.e., dies consisting of a die section without an opposing punch) are preferred. After mounting the steel rule possessing a sharp edge and a blunt edge bent or formed to the outline of the desired holographic product, the sharp edge is operated against a flat hard platen overlaid by a sheet of the holographic material to be cut and sealed.

Three major factors are involved in die cutting and sealing holographic materials: the composition of the board used as a base for the steel rule die, the temperature to which the die is heated and the dwell time in the cutting process. Suitable materials for the base are Permaplex, ABO and Phenolic, all of which are available commercially and are capable of withstanding the heat required to seal the edges. A flexible steel rule having a blunt edge and a sharp edge is bent into the outline shape of the desired product and press fitted into a matching slot cut into the board until it is flush with the top surface of the board. A suitable board is ⅝ inches thick. A suitable steel rule is ⅞ inches wide and approximately ¹⁄₃₂ inches thick at its blunt edge. Thus the sharp edge of the steel rule would extend ¼ inches below the bottom surface of the board. A ½ inch thick silicone pad can be placed in the cavity formed by the exposed edges of the steel rule to eject the cut blank of holographic material when the die retracts to complete the cutting operation.

Figure 6:
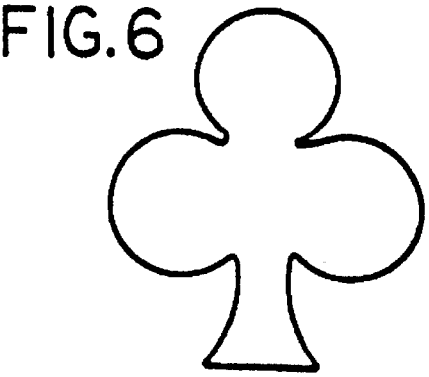
FIG. 6 is a frontal view of holographic material with a simpler shape which can be cut and sealed with a steel rule die.

FIG. 6 illustrates a shape that may be as complex as a steel rule die can effectively cut.

The cutting operation is carried out in a large free-standing press with the preheated die mounted in its upper chamber. A suitable temperature for heating the die is approximately 470 degrees Fahrenheit. To assure quality output and long life for the die, the die must be mounted securely and operated within close tolerances. The mounted die descends electrically or hydraulically upon the holographic material placed on the solid flat lower platen for a dwell time of approximately two seconds to cut and seal the edges of the holographic material in the desired shape. The holographic material can be fed manually or from web to web into the press. The resulting blank will protect its embossed surface from exposure to moisture or abrasion even after attachment to clothing and subjected to as many washing and drying cycles as clothing is subjected to during its useful life. The process itself can cut and seal economically, accurately, efficiently and rapidly. The principal disadvantage of the process is its limitation to relatively simple shapes or outlines of the finished product. The cut edge is also not as smooth as the other techniques disclosed herein, especially the laser process. The previously described hot tip cutter is more suitable for more complex shapes such as Christmas trees or Old English lettering.

The most preferred process for present purposes is laser machining. This process combines the ability to cut complex shapes with economy, speed, accuracy, efficiency and a superior edge. The laser cut edges of the finished product are not only completely and consistently sealed, they are smooth and even and are cut with less waste. The word laser is an acronym for light amplification by stimulated emission of light. Industrial applications of lasers are now commonplace and their use in cutting operations is well established. Their use for cutting holographic materials for sealing purposes is new. The $CO_2$ and Nd:YAG are the two most commonly used industrial material processing tools.

For present purposes the $CO_2$ is preferred. The $CO_2$ lasing medium is a flowing gas mixture of helium, nitrogen and carbon dioxide which emits a 10.6 micron wavelength of coherent light which is the same wavelength as heat. Its advantages for cutting holographic materials are many. The laser is a cutting source with a single very small point (0.001 inch to 0.020 inch diameter) allowing for very narrow cut widths. The point can also be moved in any direction unlike the fixed position of a die cutting edge. The laser is a forceless process which can cut flimsy materials with no support. The laser beam is always sharp. The laser also works well in conjunction with computer numerical controls since the energy in the focused point can be controlled easily and moved in any direction.

Thus in the most preferred process art work is initially scanned, exported to a disk holding many files, converted numerically, and imported to standard $CO_2$ laser machining equipment which, when activated with a preferred beam diameter of 0.013 inch, cuts easily at high speed. Speed of cutting is limited only by the power available from the laser, Laser cutting, generally as well as for present purposes, provides a very small heat-affected zone compared to heated die cutting. Suitable basic equipment to carry out the foregoing laser machining operations on a small scale includes a General Scanning DE 2000 Galvo, a 286SX computer, a Trumpf TLF 750 $CO_2$ Laser, a Down collimator with lenses, a beam switch and a laser firing circuit. Blocks, tubing and clamps would also be employed. More sophisticated equipment would be required for large scale production. Those with ordinary skill in the laser machining art would be able to carry out the process and produce the products of the present invention utilizing information existing in the known laser art.

Industrial lasers, such as the $CO_2$, allow a very large amount of energy to be focused on a small, well-defined spot. The laser heats, melts or vaporizes materials only where it is guided by its computer controls. For present purposes as well as generally, laser machining provides a fast, clean process, simple in tooling. It produces a clean edge with little burring, close tolerances and no tool wear. Thus the finished product provides holographic imagery in complex shapes (as illustrated in FIG. 3, 4 and 5) with sealed edges and an embossed or other related reflective surface that is completely protected from environmental exposure and a multilayered assembly that is highly resistant to delamination. After attachment to washable or dry cleanable clothing such cut and sealed holograms stay attached longer than the ordinary useful life of the clothing.

Laser cut and sealed holographic materials have thus far produced the best and most abrasion and moisture resistant seals capable of outlasting the substrates on which they are attached under ordinary conditions of use. Their edges are also the smoothest and most consistently and completely sealed.

The products of the present invention are especially suitable for attachment to fabrics such as cotton, polyester, acrylics, wools, heat resistant nylons, and vinyls. The product can also be attached to water permeable substrates other than fabrics. For maximum resistance to moisture and abrasion, all such substrates must be bonded to the holograms or diffraction gratings with a water impermeable adhesive. Water impermeable substrates, such as metal, wood, leather, fiberboard, glass, paper and plastic, can also be utilized with the product of the present invention to reduce the tendency of moisture to penetrate the layers of the holographic materials and lead to delamination.

The cutting processes disclosed herein can also be used to cut and seal pressure sensitive holographic materials which can be both water permeable or impermeable adhesives. Since some products are not employed under circumstances that require the same degree of resistance to penetration by moisture as products affixed to washable fabrics, the adhesives for those products need not be water impermeable. Holograms affixed to the cover of a magazine are examples of products that do not require the use of a water impermeable adhesive. Nonetheless the use of a hot cutting tool produces a superior edge to such holographic materials with greater resistance to mechanical abrasion and penetration by moisture than would otherwise be the case. Attachment of an aluminum coated embossed surface to a paper substrate is best accomplished by use of a starch-based adhesive modified with silicate or casein-stabilized copolymer dispersions or rubber lattices. Reactive polyurethane adhesives are best used for attaching a plastic embossed surface to a paper substrate. To attach a hologram label to a glass substrate, dextrin starch and casein glues can to used. To attach a hologram label to a plastic substrate a copolymer emulsion-based and hotmelt adhesives or combinations of both can be used. An especially versatile family of adhesives are the A-10 acrylic adhesive transfer tapes produced by 3M of St. Paul, Minn. They can be used to attach the holographic materials of the present invention to a wide variety of substrates, including stainless steel, aluminum, painted metal, rigid vinyl, ABS, polycarbonate, glass, acrylic and epoxy. These adhesives will provide superior resistance to peeling and exposure to solvents (including mild acids, mild alkalies, and typical aromatic and aliphatic hydrocarbon and ketone solvents) and water.

These A-10 adhesives are supplied in roles consisting thin layers of adhesive separated by a release paper layer. When unrolled the release paper layer with the adhesive layer attached separates from the role. The exposed side of the adhesive layer can be affixed to the underside of a holographic film before cutting and sealing the holographic film. The release paper layer remains attached and is cut in the same shape as the holographic film. To attach the cut and sealed hologram to a substrate the release paper is peeled off and the adhesive is affixed to the substrate. This would be a suitable procedure for attaching a holographic image or diffraction grating pattern to a license plate to provide a decorative effect which can not be matched in any other way.

Still another variation of a superior holographic product with a sealed edge can be produced in the following manner. A one- or two-mill polyester film is embossed on one surface to produce a holographic image and then metallized on the embossed surface. The resulting product is die cut into tiny particles (generally circular in shape). The edges of these particles are then sealed by mixing them with an adhesive base and curing. A plastisol adhesive base is suitable for sealing the edges of a product that is destined for use on a substrate that will be subjected to washing and drying. A water base adhesive is suitable for sealing the edges of a product destined for use on a substrate that will be subjected to dry cleaning. The plastisol base requires oven curing while the water base can be air dried.

A suitable plastisol adhesive for this purpose is #1180-200 Clear Plastisol from Triangle Ink Company, Wallington, N.J. 07057. A suitable water base adhesive is #9560 Aquapaque Clear from Naz-Dar/KC, Chicago, Ill. 60622. Preparatory to affixing these sealed particles to a fabric substrate, they are forced through a coarse screen upon which a design has been prepared before curing in a dryer. After affixing to a fabric substrate they are capable of reflecting a rainbow of iridescent colors as programmed into the embossed surface. Gold or silver coloring are the most effective basic colors for such a product. Because the particles have sealed edges, they are capable of withstanding washing and drying or dry cleaning cycles.

The cut holographic materials of the present invention alone or in combination with various graphics and ornamental enhancements can be attached to various substrates in a conventional manner like other ornamental or decorative products intended for the same uses.

The processes and products of the invention disclosed herein represent preferred embodiments of the invention. Many other variations are possible but are impossible to disclose in their entirety. It should also be understood that the words and drawings used are merely descriptive and illustrative and are not intended as exact representations of or inflexible limitations on the spirit and scope of the invention disclosed herein which can only be measured by the legally valid scope of the appended claims.

I claim:

1. Holographic products suitable for attachment to a substrate consisting essentially of a transparent abrasion resistant moisture impervious plastic top layer, an adhesive bottom layer, an intermediate reflective surface or layer capable of reflecting a multi-colored or multi-dimensional holographic image or pattern through the said top layer in the presence of light, and a seal along the entire perimeter of the assembly of said layers thereby substantially preventing separation of the said layers by ordinary wear and tear or moisture.

2. The product of claim 1 wherein the adhesive is a pressure sensitive adhesive.

3. The product of claim 1 wherein the adhesive is a contact adhesive.

4. The product of claim 1 wherein the reflective surface or layer is non-metallic.

5. The product of claim 1 wherein the adhesive is a water permeable adhesive.

6. The combination of a holographic product affixed to a substrate wherein the said product comprises a transparent abrasion resistant moisture impervious plastic top layer, an adhesive bottom layer, an intermediate reflective surface capable of reflecting a multi-colored or multi-dimensional holographic image or pattern through said top layer in the presence of light, and a seal along the entire perimeter of said layers that binds the said layers together at the outside edges of the said layers making up the assembly thereby substantially preventing separation of the layers by ordinary wear and tear or moisture.

7. The combination of claim 6 wherein said substrate is water impermeable and said adhesive layer consists of a water permeable adhesive.

8. The combination of claim 7 wherein said substrate is metallic.

9. The combination of claim 7 wherein said substrate is glass.

10. The combination of claim 7 wherein said substrate is plastic.

11. A holographic product which comprises small particles of holographic material attached to a fabric substrate wherein said particles are cut out of an embossed transparent plastic holographic film metallized on its embossed surface and mixed with an adhesive material capable of sealing the cut edges of the said particles and capable of adhering said coated particles to said substrate.

* * * * *